(12) United States Patent
Maaref et al.

(10) Patent No.: US 10,764,882 B2
(45) Date of Patent: *Sep. 1, 2020

(54) TERMINAL BASED GROUPING VIRTUAL TRANSMISSION AND RECEPTION IN WIRELESS NETWORKS

(71) Applicant: HUAWEI TECHNOLOGIES CO., LTD., Shenzhen (CN)

(72) Inventors: Amine Maaref, Ottawa (CA); Mohammadhadi Baligh, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/184,630

(22) Filed: Nov. 8, 2018

(65) Prior Publication Data

US 2019/0082428 A1 Mar. 14, 2019

Related U.S. Application Data

(63) Continuation of application No. 15/590,738, filed on May 9, 2017, now Pat. No. 10,129,864, which is a
(Continued)

(51) Int. Cl.
*H04W 72/04* (2009.01)
*H04L 29/12* (2006.01)
(Continued)

(52) U.S. Cl.
CPC ......... *H04W 72/042* (2013.01); *H04L 12/189* (2013.01); *H04L 61/2069* (2013.01);
(Continued)

(58) Field of Classification Search
CPC ... H04W 72/04; H04W 72/121; H04W 76/40; H04W 88/04; H04L 12/189; H04L 61/2069
See application file for complete search history.

(56) References Cited

U.S. PATENT DOCUMENTS 8,228,836 B2 7/2012 Erkip et al.
8,428,606 B1 4/2013 Vrzic et al.
(Continued)

FOREIGN PATENT DOCUMENTS

CN 102421068 A 4/2012
CN 102948104 A 2/2013
(Continued)

OTHER PUBLICATIONS

Raghothaman, B., et al., "System Architecture for a Cellular Network with Cooperative Mobile Relay," VTC Fall, Sep. 2011, pp. 1-5.
(Continued)

*Primary Examiner* — Kevin D Mew
(74) *Attorney, Agent, or Firm* — Slater Matsil, LLP

(57) ABSTRACT

Virtualized group-wise communications between a wireless network and a plurality of user equipments (UEs) are supported using UE cooperation. UE cooperation includes receiving, at a cooperating UE (CUE), downlink information from the wireless network destined for a target UE (TUE) and associated with a group identifier (ID). The group ID indicates a virtual multi-point (ViMP) node that includes the TUE and the CUE. The UE cooperation also includes sending the downlink information to the TUE. The UE or UE component can have a processor configured to forward between the wireless network and a TUE at least some information that is associated with a group ID indicating a ViMP node that groups the TUE and the UE.

28 Claims, 4 Drawing Sheets

Related U.S. Application Data continuation of application No. 14/536,435, filed on Nov. 7, 2014, now Pat. No. 9,655,094, which is a continuation of application No. 13/646,549, filed on Oct. 5, 2012, now Pat. No. 8,902,907.

(51) Int. Cl.
  *H04W 88/04* (2009.01)
  *H04W 72/12* (2009.01)
  *H04W 76/40* (2018.01)
  *H04L 12/18* (2006.01)

(52) U.S. Cl.
  CPC ......... *H04W 72/121* (2013.01); *H04W 76/40* (2018.02); *H04W 88/04* (2013.01)

(56) References Cited

U.S. PATENT DOCUMENTS

| | | |
|---|---|---|
| 8,861,550 B2 | 10/2014 | Park et al. |
| 8,902,907 B2 | 12/2014 | Maaref et al. |
| 8,958,753 B2 | 2/2015 | Wang et al. |
| 8,976,884 B2 | 3/2015 | Krishnamurthy et al. |
| 9,002,281 B2 | 4/2015 | Fwu et al. |
| 9,084,241 B2 | 7/2015 | Madan et al. |
| 9,144,098 B2 | 9/2015 | Hakola et al. |
| 9,313,781 B2* | 4/2016 | Park ............ H04W 72/121 |
| 9,838,163 B2 | 12/2017 | Kim et al. |
| 2003/0037158 A1 | 2/2003 | Yano et al. |
| 2003/0043915 A1 | 3/2003 | Costa et al. |
| 2004/0143849 A1 | 7/2004 | Costa |
| 2004/0143850 A1 | 7/2004 | Costa |
| 2004/0162083 A1 | 8/2004 | Chen et al. |
| 2006/0114877 A1 | 6/2006 | Heo et al. |
| 2006/0256785 A1 | 11/2006 | Nagai et al. |
| 2008/0253300 A1 | 10/2008 | Wakabayashi et al. |
| 2010/0009675 A1 | 1/2010 | Wijting et al. |
| 2010/0260101 A1 | 10/2010 | Tsirtsis et al. |
| 2011/0237231 A1 | 9/2011 | Horneman et al. |
| 2011/0258327 A1 | 10/2011 | Phan et al. |
| 2011/0268006 A1 | 11/2011 | Koskela et al. |
| 2012/0002745 A1 | 1/2012 | Ko et al. |
| 2012/0057456 A1 | 3/2012 | Bogatin et al. |
| 2012/0064935 A1 | 3/2012 | Hakola et al. |
| 2012/0082098 A1 | 4/2012 | Oprescu-Surcobe et al. |
| 2012/0120845 A1 | 5/2012 | Perras et al. |
| 2012/0142269 A1 | 6/2012 | Wilhite |
| 2012/0149348 A1 | 6/2012 | Patel et al. |
| 2012/0322484 A1 | 12/2012 | Yu et al. |
| 2012/0329555 A1 | 12/2012 | Jabara et al. |
| 2013/0039243 A1* | 2/2013 | Park ............ H04W 52/0216 370/311 |
| 2013/0044669 A1 | 2/2013 | Song et al. |
| 2013/0095821 A1 | 4/2013 | Lim et al. |
| 2013/0128832 A1 | 5/2013 | Kang et al. |
| 2013/0156008 A1 | 6/2013 | Dinan |
| 2013/0183963 A1 | 7/2013 | Turtinen et al. |
| 2013/0196704 A1* | 8/2013 | Jain ............ H04W 4/70 455/518 |
| 2013/0223356 A1 | 8/2013 | Khoshnevis et al. |
| 2013/0235754 A1 | 9/2013 | Lim et al. |
| 2013/0244648 A1 | 9/2013 | Singh et al. |
| 2013/0250771 A1 | 9/2013 | Yu et al. |
| 2013/0272196 A1 | 10/2013 | Li et al. |
| 2013/0272262 A1* | 10/2013 | Li ............ H04W 28/02 370/330 |
| 2013/0286882 A1 | 10/2013 | Lim et al. |
| 2013/0308490 A1 | 11/2013 | Lim et al. |
| 2013/0310103 A1 | 11/2013 | Madan et al. |
| 2013/0316727 A1 | 11/2013 | Edge |
| 2013/0336278 A1* | 12/2013 | Kim ............ H04W 72/042 370/329 |
| 2014/0003262 A1* | 1/2014 | He ............ H04L 5/0053 370/252 |
| 2014/0003301 A1 | 1/2014 | Madan et al. |
| 2014/0003319 A1* | 1/2014 | Etemad ............ H04W 28/08 370/312 |
| 2014/0044024 A1 | 2/2014 | Zou et al. |
| 2014/0064176 A1 | 3/2014 | Anchan |
| 2014/0078971 A1 | 3/2014 | Bontu et al. |
| 2014/0086158 A1 | 3/2014 | Tavildar et al. |
| 2014/0098719 A1* | 4/2014 | Kim ............ H04L 5/0055 370/280 |
| 2014/0169259 A1 | 6/2014 | Lee et al. |
| 2014/0226629 A1 | 8/2014 | Kim et al. |
| 2015/0063318 A1 | 3/2015 | Merlin et al. |
| 2015/0071212 A1 | 3/2015 | Kim et al. |
| 2015/0094073 A1 | 4/2015 | Peng |
| 2015/0146637 A1 | 5/2015 | Morita |
| 2015/0296551 A1* | 10/2015 | Kim ............ H04W 68/005 455/426.1 |
| 2016/0044616 A1* | 2/2016 | Lee ............ H04W 56/0095 370/350 |
| 2016/0066337 A1 | 3/2016 | Sartori et al. |
| 2016/0073408 A1 | 3/2016 | Sartori et al. |
| 2016/0073422 A1* | 3/2016 | Pajukoski ............ H04W 72/121 370/329 |

FOREIGN PATENT DOCUMENTS

| | | |
|---|---|---|
| WO | 2011123809 A1 | 10/2011 |
| WO | 2011156958 A1 | 12/2011 |
| WO | 2012057547 A2 | 5/2012 |
| WO | 2012093783 A2 | 7/2012 |
| WO | 2012108621 A1 | 8/2012 |

OTHER PUBLICATIONS

Vanganuru, K., et al., "Uplink System Capacity of a Cellular Network with Cooperative Mobile Relay," Wireless Telecommunications Symposium, IEEE, Apr. 2011, pp. 1-7.

* cited by examiner

TERMINAL BASED GROUPING VIRTUAL TRANSMISSION AND RECEPTION IN WIRELESS NETWORKS

This patent application is a continuation of U.S. patent application Ser. No. 15/590,738 filed on May 9, 2017 entitled "Terminal Based Grouping Virtual Transmission and Reception in Wireless Networks," which is a continuation of U.S. patent application Ser. No. 14/536,435 filed on Nov. 7, 2014, now U.S. Pat. No. 9,655,094, issued on May 16, 2017 entitled "Terminal Based Grouping Virtual Transmission and Reception in Wireless Networks," which is a continuation of U.S. patent application Ser. No. 13/646,549 filed on Oct. 5, 2012, now U.S. Pat. No. 8,902,907, issued on Dec. 2, 2014 entitled "Terminal Based Grouping Virtual Transmission and Reception in Wireless Networks," all of which applications are hereby incorporated by reference herein as if reproduced in their entireties.

TECHNICAL FIELD

The present invention relates to the field of wireless communications and wireless networks infrastructure design and optimization, and, in particular embodiments, to a system and method for terminal based grouping virtual transmission and reception in wireless networks.

BACKGROUND

Traditionally, in wireless communication networks, terminal devices, such as user equipment (UE) are addressed by the network through individual identifiers (IDs), which are used to create individual communication channels between the network and UEs. The UE is any device used directly by an end-user to communicate. For example, the UE can be a hand-held telephone, a laptop computer equipped with a mobile broadband adapter, or any other user communications device. Recently, cooperative multi-point (CoMP) transmission/reception, where multiple E-UTRAN Node-Bs (eNBs) cooperate to transmit data to UEs, has received attention and is currently being integrated in the 3GPP standard. UE cooperation based on device-to-device (D2D) communications is another technology that has received less attention in comparison. However, with the advances in (D2D) communications in recent years, UE cooperation is expected to play a more prominent role in the future of wireless communications.

SUMMARY

In one embodiment, a method for virtualized group-wise communications between a wireless network and a plurality of UEs is disclosed. The method includes receiving, at a cooperating UE (CUE), downlink information from the wireless network, wherein the downlink information is destined for a target UE (TUE) and associated with a group ID, the group ID for targeting a virtual multi-point (ViMP) node that includes the TUE and the CUE. The method further includes sending the downlink information to the TUE.

In another embodiment, a UE or UE component supporting virtualized group-wise communications between a wireless network and a plurality of user equipments is disclosed. The UE includes a processor configured to forward information on the signal targeting to TUE, wherein the information is associated with a group ID indicating a ViMP node that groups the TUE and the UE.

In another embodiment, a method for virtualized group-wise communications between a wireless network and a plurality of user equipments is disclosed. The method includes receiving, at a TUE, downlink information that is forwarded by a CUE from the wireless network, wherein the downlink information is associated with a group ID, the group ID indicating a ViMP node that includes the TUE and the CUE. The method further includes obtaining control or data information destined for the TUE from the downlink information.

In another embodiment, a UE supporting virtualized group-wise communications between a wireless network and a plurality of user equipments is disclosed. The UE includes a processor configured to exchange at least some information with the wireless network via a CUE, wherein the information is associated with a group ID indicating a ViMP node that groups the UE and the CUE.

In yet another embodiment, a network component for supporting virtualized group-wise communications between a wireless network and a plurality of user equipments, the network component comprising a processor configured to group a plurality of UEs in a ViMP node based on proximity between the UEs, assign a group ID to the ViMP node, indicate the assigned group ID to each of the UEs in the ViMP node, and transmit information with the group ID to a plurality of UEs in a ViMP node, wherein the information is destined to a target UE (TUE) from the UEs, and wherein the group ID enables the CUE to detect the information and forward at least some of the information to the TUE.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The number of end user terminals or UEs in current cellular networks (e.g., smartphones or other mobile communications devices) keeps on increasing. The next fifth generation (5G) cellular networks are expected to feature higher number of UEs. Generally, the ratio of active UEs to inactive (or idle) UEs is relatively low. Using UE cooperation may improve diversity in space, time, and frequency and thus increase the robustness against signal fading and interference in the network.

Embodiments are disclosed herein for providing virtualized group-wise communications between the network and UEs using UE cooperation. A plurality of UEs are configured to form via UE cooperation one or more logical or virtual nodes that act as single distributed virtual transceivers. The embodiments include a system and method for configuring and operating a group of UEs as a virtual multi-point (ViMP) node which acts as a virtual transmitter for an uplink channel and a virtual receiver for a downlink channel. As such, the UEs of the ViMP node jointly transmit data on the uplink channel or jointly receive data on the downlink channel. The UEs of each ViMP node are assigned a unique group ID (a ViMP ID), which is used for control and data channel decoding purposes on the uplink and downlink.

The UEs in the ViMP node cooperate with each other using device-to-device (D2D) communications, for example according to an adjustable cooperation strategy that adapts to network conditions. This enables joint transmission/reception to/from the UEs, which can complement the cooperative multipoint (CoMP) transmission/reception concept in the LTE/LTE-A standard that deals with joint transmission/reception at the eNB side. For a ViMP node, the UEs comprise at least one target UE (TUE) and may also include one or more cooperating UEs (CUEs). The TUEs are the UEs for which data is meant to be communicated with the network and the one or more CUEs jointly cooperate with the TUEs to help transmit/receive the data to/from the network.

Figure 1:
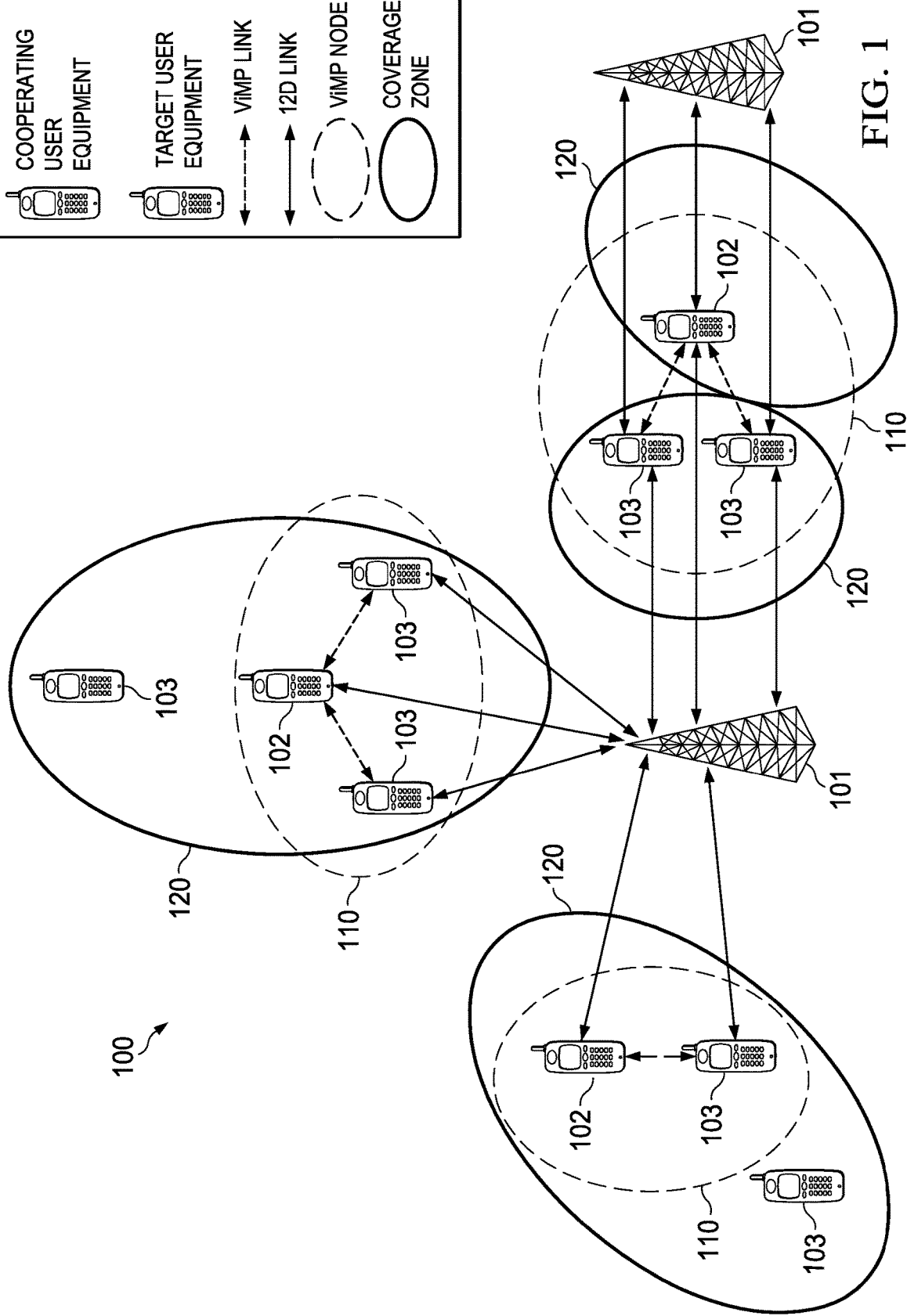
FIG. 1 illustrates an embodiment virtual multi-point (ViMP) transmission/reception system.

FIG. 1 illustrates an embodiment ViMP transmission/reception system 100 that can be implemented in a wireless network. The ViMP transmission/reception system 100 comprises one or more base stations (BSs) 101 and a plurality of UEs that are configured to communicate with the BSs 101 using infrastructure-to-device (I2D) links, e.g., cellular or radio links, wireless or wired backhaul links outside the wireless network's infrastructure, or combinations thereof. The BSs 101 may be base transceiver stations (BTSs) or eNBs that provide the UEs access to a wireless network and possibly other networks. The UEs may be located in cells 120 that correspond to coverage areas for the BSs 101. The UEs include TUEs 102 and CUEs 103, which are grouped in a plurality of ViMP nodes no. Each ViMP node no is associated with a unique ViMP ID, where each TUE and CUE in the group are assigned that same ID. The ViMP ID for each ViMP node is used for forwarding, processing, and/or decoding control and data channel communications on the uplink from the corresponding UEs and on the downlink to the same UEs.

The ViMP nodes no are UE-centric, i.e., tailored to the corresponding TUEs 102. The data communicated from the network is targeted to at least one TUE 102 in each ViMP node no. The formation of the ViMP nodes no is determined by the network, for instance based on UE-to-UE proximity. The network may group the TUEs 102 and CUEs 103 together in their respective ViMP nodes no based on the proximity between the UEs, e.g., to realize sufficient proximity between the UEs in each ViMP node no to enable D2D communications. The network may use I2D links with the UEs to set up the ViMP nodes no. The UEs in the ViMP nodes no are also determined based on the availability, type, and/or range of D2D communications at the UEs. In other embodiments, the formation of ViMP nodes no, including the selection of UEs in each ViMP node no, is determined by the UEs, e.g., via UE cooperation and D2D communications, or by both the UEs and the network.

When the ViMP nodes no are determined, the network assigns unique IDs, also referred to herein as ViMP IDs or ViMP group IDs, to the ViMP nodes no, where each UE is configured with its ViMP node's ID. The network uses the ViMP group IDs for the transmission and decoding of control and/or data information to the TUEs 102 in the ViMP nodes no. The CUEs 103 cooperate with the TUEs 102 in their respective ViMP nodes no to receive and/or transmit control/data information from/to the network also using the assigned ViMP group IDs. Using the assigned ViMP group ID, the UEs in the ViMP node 210 are perceived by the network as a single distributed antenna receiver (RX) on the downlink and transmitter (TX) on the uplink.

Grouping multiple UEs that cooperate to transmit and receive on the uplink and downlink, respectively, may provide increased robustness against signal fading and/or interference. UE cooperation is achieved using D2D communications between the TUEs 102 and the CUEs 103 to establish ViMP links between them. The CUEs 103 use the ViMP links between the TUEs and I2D links with the BSs 101 to serve as relays for signals or channels on the uplink and/or downlink for the TUEs 102. For example, the CUEs 103 may use Bluetooth connections, Wi-Fi links, and/or other D2D technologies to communicate with the CUEs 103 in the same ViMP nodes no and forward at least some of the signals or channels between the TUEs 102 and the corresponding BSs 101.

Further, the network is aware (for example at a network control layer) of the UE cooperation in their respective ViMP nodes no, and hence can condition transmissions to the UEs accordingly to benefit from UE cooperation and improve communications and resource management. For instance, the network conditions and optimizes different transmission schemes, such as for scheduling, feedback, Hybrid automatic repeat request (HARQ), and/or precoding, according to the UE cooperation scenario or strategy in the ViMP nodes no. Based on network conditions, the network and the TUEs 102 may also use single or direct links (direct links between the TUEs 102 and BSs 101) without the help of the CUEs 103. In this case, the TUEs 102 are treated as single entities without group virtualization similar to typical UE communications behavior in current wireless systems.

To improve energy efficiency, the network may turn off some of the BSs 101 and use instead UE cooperation between the CUEs 103 and the TUEs 102 to communicate with the TUEs 102. For example, the CUEs 103 use D2D communications with the TUEs 102 to relay at least some of the channels or signals of the TUEs 102 with a reduced number of BSs 101. Replacing the operation of some BSs 101 with the CUEs 103 also reduces network deployment cost since fewer BSs 101 may be needed. Increasing robustness against signal fading and interference, conditioning transmissions according to UE cooperation, and/or improving energy efficiency of the network components may increase network throughput or coverage. For example, the coverage gain using the ViMP transmission/reception system 100 can be about 50%, similar to gains observed in cloud radio access networks (CRANs).

Unlike relays in current wireless networks that are typically static and based on stationary infrastructures to support multiple UEs, the CUEs 103 in the ViMP transmission/reception system 100 are dynamically selected and configured, i.e., different CUEs 103 may be configured (by the network or through UE direct negotiation) and selected at different times and/or network conditions. Thus, the list of CUEs 103 in the network may be dynamically updated (by the network or through UE direct negotiation) over time. For example, the CUEs 103 are selected from idle UEs to support the TUEs 102 that are active (i.e., in communication with the network). The idle UEs may outnumber the active UEs. However, some or a limited number of CUEs 103 of the idle UEs may be selected and designated for the TUEs 102 at a period of time. The CUEs 102 may also be selected from active UEs that may be in proximity of the TUEs 102 to serve the TUEs 102. Thus, one or more active and/or idle CUEs 103 may be assigned to one or more TUEs 102 in their corresponding ViMP nodes no. The selection may depend on the availability and range of D2D communications between the idle UEs and the TUEs 102 (the active UEs). Over time, the idle and active UEs may change, and hence the TUEs 102 and the CUEs 103 may also change. For example, some of the previous CUEs 103 may become TUEs 102 that are meant to receive information. Some of the previous TUEs 102 may also become CUEs 103. Compared to relays and other static devices that may be used in traditional networks to improve capacity or range, the TUEs 102 and CUEs 103 have more limited capacity, power budget, and radio frequency (RF) isolation between access and backhaul links, and accordingly may have lower cost.

Figure 2:
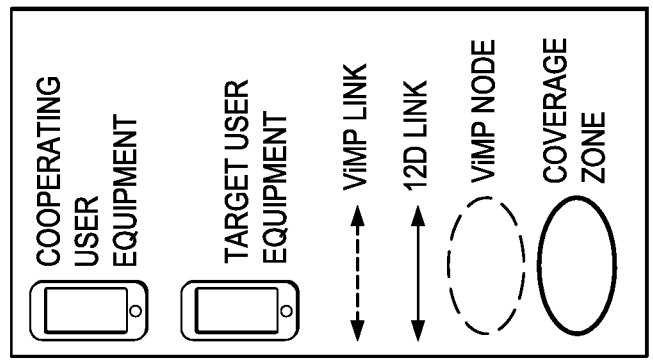
FIG. 2 illustrates a plurality of embodiment ViMP designs.
Figure 2:
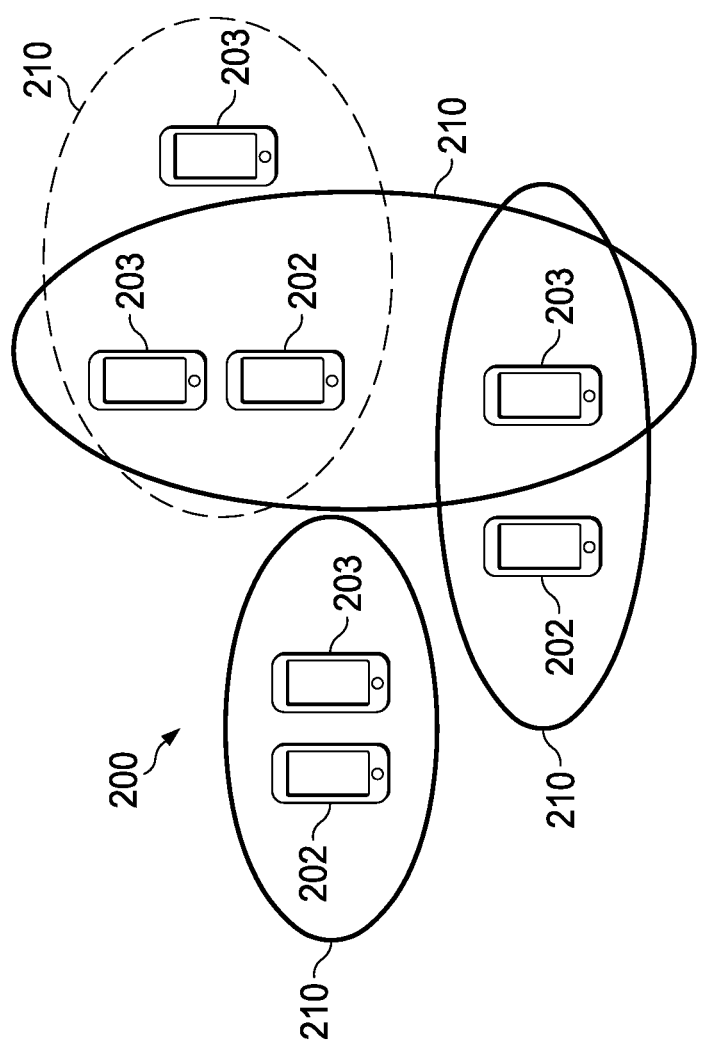

FIG. 2 illustrates a plurality of embodiment ViMP designs or formations 200 that can be configured in a wireless network or communications system, such as in the ViMP transmission/reception system 100. The ViMP formations 200 include one-to-one and many-to-one mappings between multiple TUEs 202 and respective ViMP nodes 210. Each of the TUEs 202 is associated with at least one ViMP node 210. One TUE 202 may be assigned to more than one ViMP node 210, which is referred to herein as a one-to-many mapping. Multiple TUEs 202 may also be assigned to the same ViMP node 210. This is referred to herein as a many-to-one mapping. The one-to-many and many-to-one mappings may also include one or more CUEs 203 that are assigned to one or more ViMP nodes 210. Thus, the ViMP nodes 210 may include one or more TUEs 202 and/or one or more CUEs 203. The ViMP formations 200 may also include a singleton ViMP node (not shown), where only one TUE is assigned to the ViMP node without any other TUEs or CUEs. In this case, the ViMP node may act similar to a typical UE and communicate with the network accordingly. The singleton ViMP node is also assigned a unique ViMP group ID by the network, which is used to communicate with the single TUE of the ViMP node.

In embodiments, the UE cooperation between the UEs in respective ViMP nodes (if more than one UE belongs to the ViMP node) corresponds to one or more cooperation strategies. The UE cooperation strategies include strategies for handling degraded channel signals. For instance, one or more CUEs perform a decode and forward (DF) strategy to support communications for one or more TUEs in the ViMP node. The one or more CUEs can also perform an amplify and forward (AF) strategy to support the communications of the one or more TUEs. The strategies for degraded channel signals also include hierarchical modulation and/or coding. For example, a CUE receives and decodes a first modulated signal on a downlink and then forwards the first signal to a TUE, which also directly receives and decodes a second modulated signal (via a direct link from a BS). The TUE then combines the first and second signals to process the downlink data. This is referred to as soft combining. Similarly, two modulated signals (or more) on the uplink can be separately received by the network from a CUE and a TUE and then combined for processing.

The UE cooperation strategies also include strategies for handling non-degraded channel signals. Such strategies include joint reception on the downlink between one or more CUEs and one or more TUEs in the ViMP node, for example using log-likelihood ratio (LLR) combining or multiple-input and multiple-output MIMO (MIMO) schemes. The strategies for non-degraded channel signals also include joint transmission on the uplink between one or more TUEs and one or more CUEs, such as using Eavesdrop or HARQ schemes. The CUEs with the TUEs may switch between any of the UE cooperation strategies above based on the network channel conditions, e.g., according to whether degraded or non-degraded channel signals are detected. In an embodiment, a CUE estimates a channel between the CUE and the network and forwards the estimated channel to a corresponding TUE. The TUE also estimates a channel between the TUE and the network, and then combines the channels to obtain a combined channel for joint reception/transmission.

Figure 3:
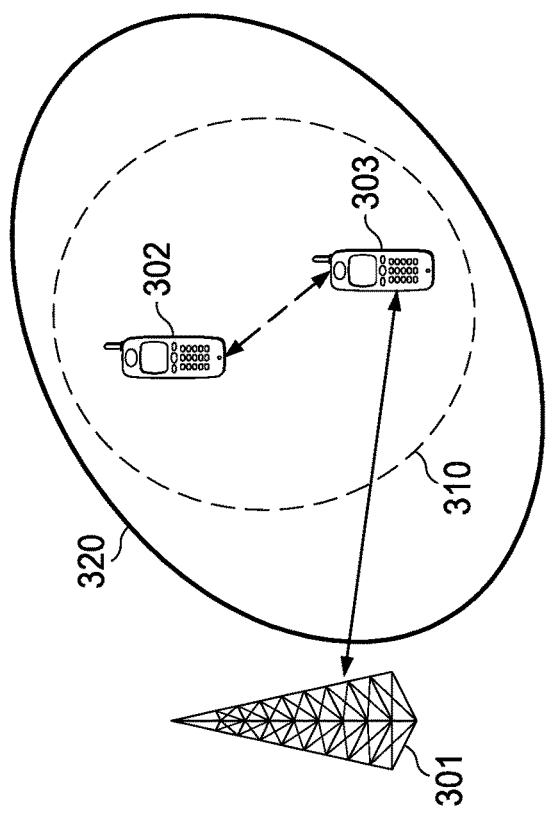
FIG. 3 illustrates a plurality of embodiment ViMP cooperation scenarios.
Figure 3:
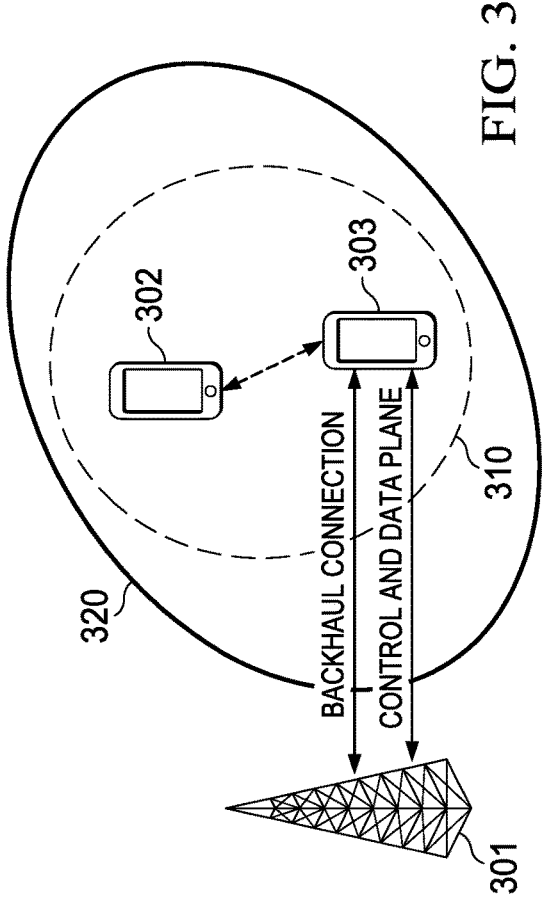
Figure 3:
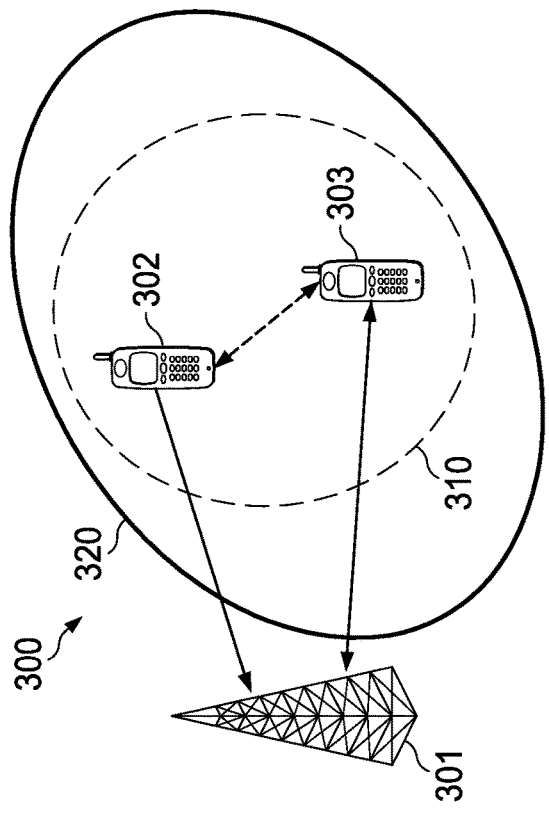
Figure 3:
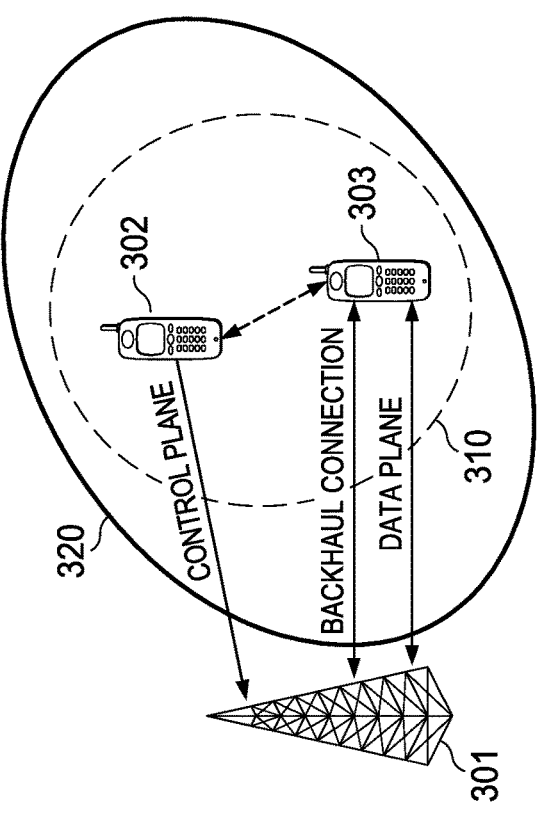

FIG. 3 illustrates a plurality of embodiment ViMP cooperation scenarios 300 that can be configured in a wireless network or communications system, such as in the ViMP transmission/reception system 100. The ViMP cooperation scenarios 300 include a scenario for capacity enhancement (Scenario 1), where a CUE 303 forwards an additional signal of a channel between a TUE 302 in the ViMP node 310 of the CUE 303 and a BS 301 within a coverage area or cell 320. The TUE 302 also transmits/receives directly a signal of the same or another channel to/from the BS 301. The additional signal supported by the CUE 303 for the TUE 302 increases the communications capacity (e.g., in terms of channel bandwidth or number of channels) between the network and the TUE 302.

The ViMP cooperation scenarios 300 include a scenario for coverage extension (Scenario 2), where a CUE 303 forwards control or data information between a TUE 302 (in the same ViMP node 310) and a BS 301 to extend the coverage area or cell 320. In this case, the CUE 303 but not the TUE 302 is in sufficient range to establish a direct link with the BS 301. The CUE 303 uses the direct link with the BS 301 and a D2D link with the TUE 302 to extend the coverage range and allow the TUE 302 to communicate with the BS 301. The ViMP cooperation scenarios 300 also include scenarios for partial local offloading (Scenario 3) and full local offloading (Scenario 4). In partial local offloading, the TUE 302 receives/transmits control information directly from/to the BS 301 (via an I2D link) and receives data information via the CUE 303 (via a D2D link). The CUE 303 communicates the data information with the BS 301 via a backhaul connection to offload some of the wireless network traffic. Examples of the backhaul connection include a wired connection or infrastructure (e.g., a cable link or network) or a Wi-Fi link or other home networking connection, for example a link to the Internet. In full local offloading, both control and data information is forwarded between the TUE 302 and the BS 301 via the CUE 303 and a backhaul connection between the CUE 303 and the BS 301.

Figure 4:
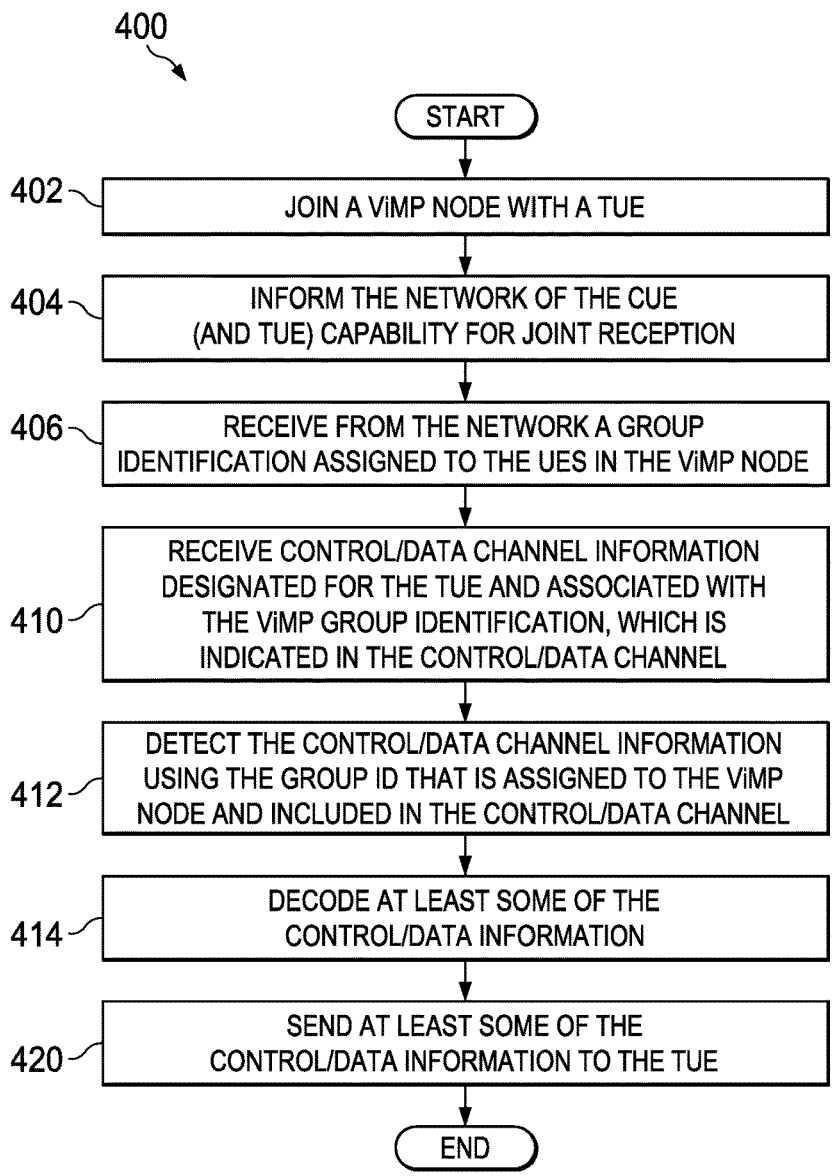
FIG. 4 illustrates an embodiment ViMP cooperation transmission/reception method.

FIG. 4 illustrates an embodiment ViMP cooperation transmission/reception method 400 that can be implemented in a wireless network or communications system, such as in the ViMP transmission/reception system 100. The method 400 is performed by a CUE associated with a TUE in a ViMP node. The method begins at block or step 402, where the CUE joins a ViMP node with the TUE, for instance via a neighbor's discovery procedure, negotiation with the TUE and the network, assistance by the network, or combinations thereof. The ViMP node joining procedure may also include one or more other TUEs and CUEs. At optional step 404, the CUE (with the TUE) informs the network of the CUE (and the TUE) capability of joint reception. The step 404 is performed when the formation of the ViMP node is achieved on the UEs' side, e.g., without the network assistance. At step 406, the CUE (with the TUE) receives from the network a group ID assigned to the UEs in the ViMP node.

At step 410, the UE receives (on the downlink) control and/or data information designated for the TUE and associated with the ViMP group ID, which is indicated in the control/data information. The control/data information is received from a transmit point (TP) or a BS that connects to the CUE via an I2D link or a backhaul connection. At step 412, the CUE detects the control/data information using the group ID that is assigned to the ViMP node and included in the control/data information. The TUE may also receive some control/data information directly from the network or from other CUEs, and detect the information using the group ID. At an optional step 414, the CUE decodes at least some of the received control/data information. At step 420, the CUE sends at least some of the control/data information, for example at least some of the data in the data channel, to the TUE.

Additionally, the CUE may receive control/data information on the uplink from the TUE, e.g., via a D2D link that connects the TUE and the CUE. The information is also associated with the ViMP group ID. The control/data information is then sent from the CUE to the TP or BS, e.g., via an I2D link.

Figure 5:
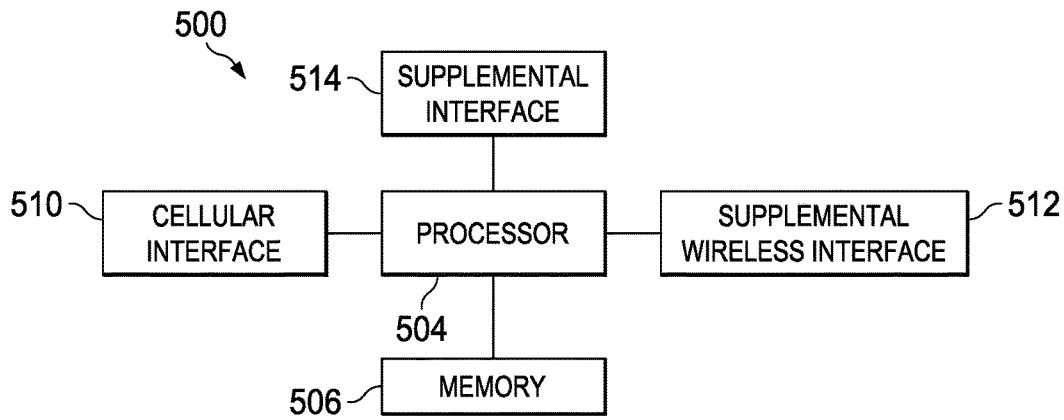
FIG. 5 is a block diagram of an embodiment communications device.

FIG. 5 illustrates a block diagram of an embodiment of a communications device 500, which may be equivalent to one or more devices (e.g., UEs, BSs, eNBs, etc.) discussed above. The communications device 500 may include a processor 504, a memory 506, a cellular interface 510, a supplemental wireless interface 512, and a supplemental interface 514, which may (or may not) be arranged as shown in FIG. 5. The processor 504 may be any component capable of performing computations and/or other processing related tasks, and the memory 506 may be any component capable of storing programming and/or instructions for the processor 504. The processor 504 may be configured to implement or support the ViMP cooperation schemes, scenarios, and strategies described above. For example, the processor 504 may be configured to support or implement the method 400. The cellular interface 510 may be any component or collection of components that allows the communications device 500 to communicate using a cellular signal, and may be used to receive and/or transmit information over a cellular connection of a cellular network. The supplemental wireless interface 512 may be any component or collection of components that allows the communications device 500 to communicate via a non-cellular wireless protocol, such as a Wi-Fi or Bluetooth protocol, or a control protocol. The supplemental interface 514 may be component or collection of components that allows the communications device 500 to communicate via a supplemental protocol, including wire-line protocols. In embodiments, the supplemental interface 514 may allow the device 500 to communicate with a backhaul network.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communicating with a wireless network, the method comprising:
   receiving, by a first user equipment (UE), a first information either from a second UE or directly from a wireless network, the first information being associated with a group identifier (ID) assigned to a group of UEs that includes the first UE and the second UE; and
   decoding at least a portion of the first information using the group ID to obtain decoded information.

2. The method of claim 1, wherein the first information is received from the second UE,
   wherein the method further comprises receiving, by the first UE, a second information directly from the wireless network, and
   wherein decoding at least the portion of the first information using the group ID comprises:
   combining the second information with the first information to obtain combined information; and
   decoding at least a portion of the combined information using a group ID to obtain the decoded information.

3. The method of claim 2, further comprising sending to the wireless network, via the second UE, uplink information that is associated with the group ID.

4. The method of claim 3, wherein the uplink information is sent jointly with the second UE to the wireless network.

5. The method of claim 2, further comprising:
   receiving, at the first UE, a signal from the wireless network; and
   decoding the signal using the decoded information.

6. The method of claim 2, wherein decoding at least the portion of the combined information using the group ID comprises decoding control signaling in the combined information using the group ID.

7. The method of claim 2, wherein decoding at least the portion of the combined information using the group ID comprises decoding bearer signaling in the combined information using the group ID.

8. The method of claim 1, wherein the first UE is outside a coverage range of the wireless network, and wherein the first UE receives the first information from the second UE to extend coverage of the wireless network.

9. A first user equipment (UE) comprising:
   a non-transitory memory storage comprising instructions; and
   a processor in communication with the non-transitory memory storage, wherein the processor executes the instructions to:
   receive a first information either from a second UE or directly from a wireless network, wherein the first information is associated with a group identifier (ID) assigned to a group of UEs that includes the first UE and the second UE; and
   decode at least a portion of the first information using the group ID to obtain decoded information.

10. The first UE of claim 9, wherein the first information is received from the second UE, wherein the processor executes the instructions to receive a second information directly from the wireless network, and wherein the processor executing the instructions to decode at least the portion of the first information using the group ID comprises the processor executing the instructions to:

combine the second information with the first information to obtain combined information; and decode at least a portion of the combined information using a group ID to obtain the decoded information.

11. The first UE of claim 10, wherein the processor executes the instructions to send to the wireless network, via the second UE, uplink information that is associated with the group ID.

12. The first UE of claim 11, wherein the uplink information is sent jointly with the second UE to the wireless network.

13. The first UE of claim 10, wherein the processor executes the instructions to:

receive a signal from the wireless network; and decode the signal using the decoded information.

14. The first UE of claim 10, wherein the processor executing the instructions to decode at least the portion of the combined information using the group ID comprises the processor executing the instructions to decode control signaling in the combined information using the group ID.

15. The first UE of claim 10, wherein the processor executing the instructions to decode at least the portion of the combined information using the group ID comprises the processor executing the instructions to decode bearer signaling in the combined information using the group ID.

16. The first UE of claim 9, wherein the first UE is outside a coverage range of the wireless network, and wherein the first UE receives the first information from the second UE to extend coverage of the wireless network.

17. A method for communicating with a wireless network, the method comprising:

receiving, by a first user equipment (UE), first information from the wireless network;

decoding, by the first UE, control information in the first information using a group identifier (ID) assigned to a group of UEs that includes the first UE and a second UE, the control information indicating that a portion of the first information is destined for the second UE; and sending, by the first UE, the portion of the first information to the second UE after decoding the control information.

18. The method of claim 17, wherein decoding the control information in the first information comprises detecting the control information using the group ID.

19. The method of claim 17, wherein decoding the control information in the first information comprises detecting the portion of the first information using the group ID.

20. The method of claim 17, further comprising:

receiving uplink information associated with the group ID from the second UE; and sending the uplink information to the wireless network.

21. The method of claim 17, further comprising amplifying the portion of the first information before sending the portion of the first information to the second UE.

22. The method of claim 17, wherein the second UE is outside a coverage range of the wireless network, and wherein the first UE sends the portion of the first information to the second UE to extend coverage of the wireless network.

23. A first user equipment (UE) comprising:

a non-transitory memory storage comprising instructions; and a processor in communication with the non-transitory memory storage, wherein the processor executes the instructions to:

receive first information from a wireless network;

decode control information in the first information using a group identifier (ID) assigned to a group of UEs that includes the first UE and a second UE, wherein the control information indicates that a portion of the first information is destined for the second UE; and send the portion of the first information to the second UE after decoding the control information.

24. The first UE of claim 23, wherein the processor executing the instructions to decode the control information in the first information comprises the processor executing the instructions to detect the control information using the group ID.

25. The first UE of claim 23, wherein the processor executing the instructions to decode the control information in the first information comprises the processor executing the instructions to detect the portion of the first information using the group ID.

26. The first UE of claim 23, wherein the processor executes the instructions to:

receive uplink information associated with the group ID from the second UE; and send the uplink information to the wireless network.

27. The first UE of claim 23, wherein the processor executes the instructions to amplify the portion of the first information before sending the portion of the first information to the second UE.

28. The first UE of claim 23, wherein the second UE is outside a coverage range of the wireless network, and wherein the first UE sends the portion of the first information to the second UE to extend coverage of the wireless network.

* * * * *